T. B. TAYLOR.
Poison-Distributer.

No. 214,205. Patented April 8, 1879.

WITNESSES:
C. Neveux
C. Sedgwick

INVENTOR:
T. B. Taylor
BY Munn & Co
ATTORNEYS.

T. B. TAYLOR.
Poison-Distributer.
No. 214,205. Patented April 8, 1879.
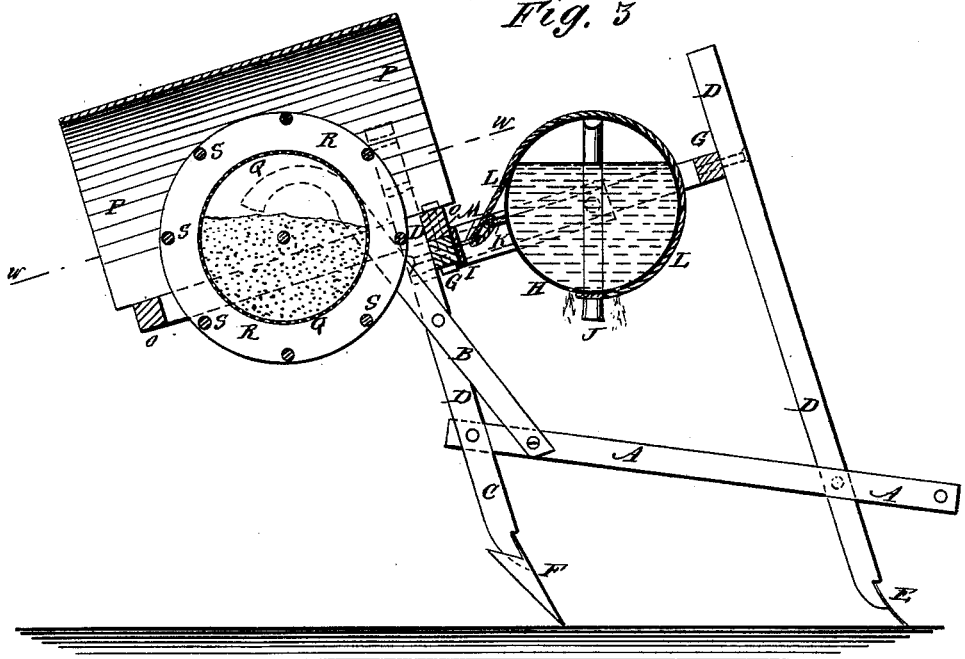
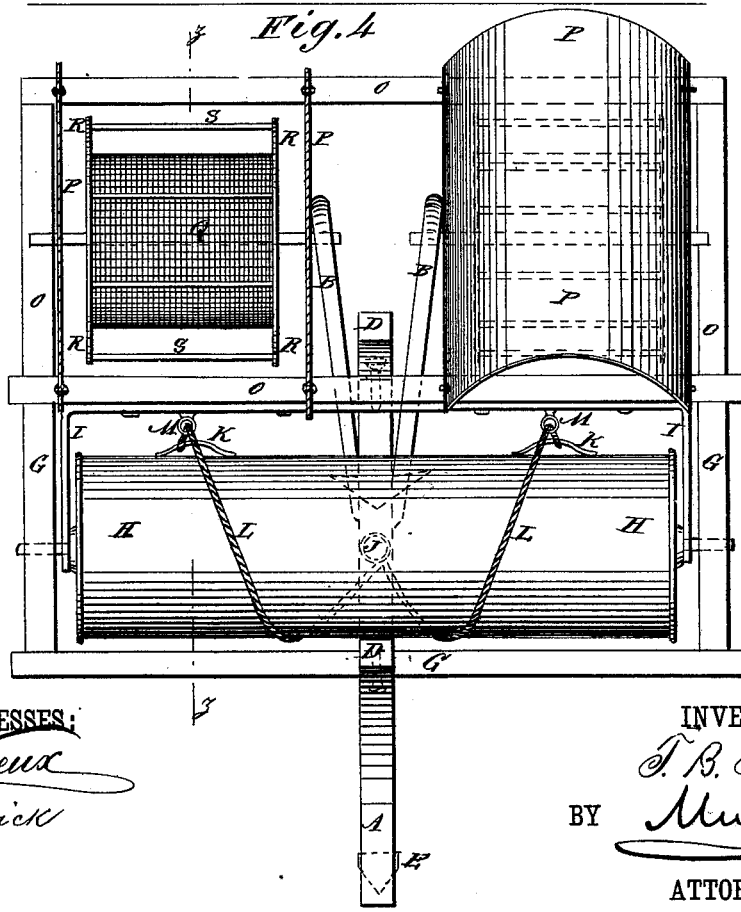
WITNESSES:
C. Neveux
C. Sedgwick
INVENTOR:
T. B. Taylor
BY Munn &Co
ATTORNEYS.

UNITED STATES PATENT OFFICE

THOMAS B. TAYLOR, OF MOUNT MEIGS, ALABAMA.

IMPROVEMENT IN POISON-DISTRIBUTERS.

Specification forming part of Letters Patent No. 214,205, dated April 8, 1879; application filed August 28, 1878.

*To all whom it may concern:*

Be it known that I, THOMAS B. TAYLOR, of Mount Meigs, in the county of Montgomery, State of Alabama, have invented a new and Improved Poison-Distributer, of which the following is a specification.

Figure 1:
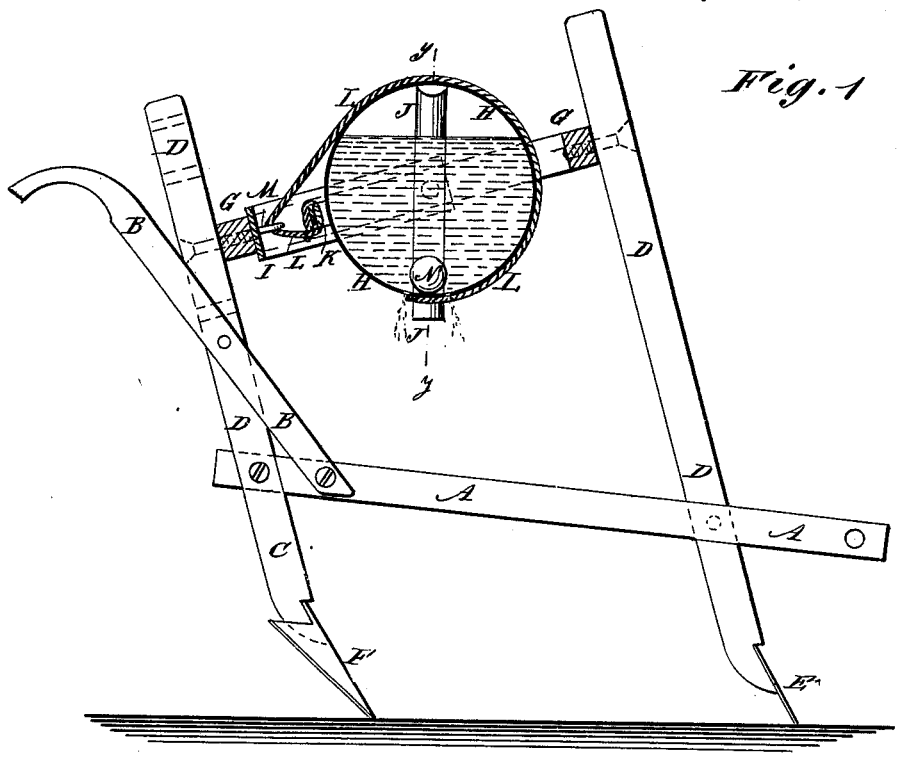
Figure 2:
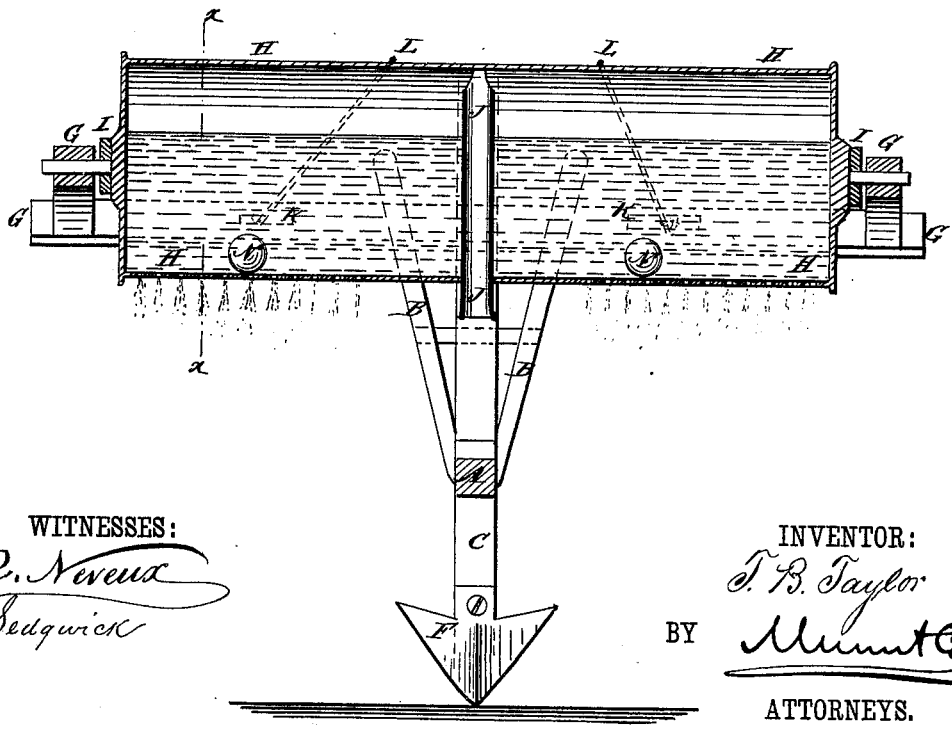

Figure 1, Sheet 1, is a vertical longitudinal section of my improved machine, taken through the line $x\ x$, Fig. 2. Fig. 2, Sheet 1, is a vertical cross-section of the same, taken through the line $y\ y$, Fig. 1. Fig. 3, Sheet 2, is a vertical longitudinal section of the same, taken through the line $z\ z$, Fig. 4, and showing the arrangement for distributing dry poison. Fig. 4, Sheet 2, is a top view of the same, partly in section, through the line $w\ w$, Fig. 3, to show the construction.

Similar letters of reference indicate corresponding parts.

The object of this invention is to furnish an improved machine for the distribution of liquid or powdered poison upon cotton and other plants, for the destruction of any insects that may be upon them, which shall be so constructed as to apply the poison very rapidly, and at the same time protect the operator from being injured by the poison, and which shall be simple in construction, convenient in use, and effective in operation.

The invention consists in the combination of the two standards, the frame, and the pivoted cylinder, perforated upon its upper side, and provided with the tube, with an ordinary plow-stock; in the combination of the frame and the two perforated cylinders with the forward frame, the pivoted cylinder, the two standards, and an ordinary plow-stock; and in the combination of the loops, the cords, and the eyes or pulleys with the pivoted cylinder and its frame, as hereinafter fully described.

A represents the beam, B the handles, and C the standard, of an ordinary plow-stock. To the forward and rear parts of the beam A are rigidly attached two standards, D, the rear one of which may be the upward extension of the plow-standard C. The lower end of the forward standard, D, extends to, or nearly to, the ground, and has a plow-plate, E, attached to it, to assist the plow-plate F, attached to the plow-standard C, in cultivating the ground, and to give steadiness to the machine, so that it may be readily controlled. To the upper parts of the standards D are pivoted the centers of the long front and rear bars of the rectangular frame G, to the centers of the short side bars of which are pivoted the ends of the sheet-metal cylinder H.

If desired, a metal strap, I, may be attached to the rear bar of the frame G, the end parts of which may be bent forward at right angles, or nearly so, and have holes formed in their ends to receive the journals of the cylinder H, the arms of the strap I thus serving as springs to keep the said cylinder in place. Several holes may be formed in the standards D to receive the pivoting-bolts of the frame G, so that the frame G and cylinder H may be adjusted higher or lower, as the height of the plants may require. In the upper side of the cylinder H are formed a number of small holes, through which the liquid poison escapes to the plants.

In the center of the perforated side of the cylinder H is formed a hole, in which is secured the tube J, through which the poison is poured into the said cylinder. The inner end of the tube J is soldered in part to the inner surface of the opposite side of the cylinder H, to prevent it from being loosened by the pressure of the liquid as the said cylinder is oscillated longitudinally to keep the insoluble poison thoroughly mixed with the liquid, so that it will pass out with it. In the sides of the inner end of the tube J are formed holes of such a size that the liquid will readily pass out of the said tube into the cylinder H. To the rear side of the cylinder H are attached loops K, to which are attached cords L, which pass through eyes M, or around pulleys attached to the rear bar of the frame G. From the eyes or pulleys M the cords L pass over the cylinder H, and are attached to the projecting end of the tube J. The cords L serve to secure the cylinder H in place and limit its movement when turned upon its journals. One or more balls, N, may be placed in the cylinder H, which, when the cylinder becomes empty, make a noise, and thus notify the operator.

If desired, the cylinder H may be rigidly secured to a single bar, G, attached to a single standard, D. In this case holes must be formed also in the upper side of the cylinder H. The holes in the upper side let the air escape in filling, and admit air to cause the liquid poison to flow out through the lower holes. This construction is a little simpler and cheaper than the other, but causes a slight waste of the poison, as some of the poison will flow out through the lower holes while the cylinder is being filled.

O is a rectangular frame, the front bar of which is designed to be lashed or otherwise secured to the rear bar of the frame G. To the frame O are secured two semi-cylindrical plates, P, with their convex sides upward, and with their inner side edges near and upon the opposite side of the handles B. In bearings in the opposite sides of the two plates P revolve the journals of two cylinders, Q, made of finely-perforated sheet metal or fine wire-gauze, to sift the dry powder poison upon the plants.

The sifting-cylinders Q are designed to be revolved by contact with the plants. The ends of the cylinders Q are provided with ring-flanges R, to which are attached the ends of a number of rods, S, to strike against the plants and revolve the said cylinders. The rods S prevent the surfaces of the cylinders from being wet by moisture from the plants, which would cause the powder to stick to them, and thus clog the discharge-holes.

When dry powder is to be used the plants should be first sprinkled with water, except when wet with dew or rain. This is done by putting water in the cylinder H.

If desired, the cylinder H and frame G may be detached and replaced with the cylinders Q and frame O; or the frame O and cylinders Q may be attached to a separate plow stock, and drawn in the rear of the plow-stock carrying the frame G and cylinder H.

In using the cylinder H the liquid poison is caused to flow out by air entering through the tube J, and by placing a damp sponge more or less tightly in the tube J the escape of the poison may be controlled as may be desired.

By this construction the leaves of the plants will be turned up by the contact of the cylinders, so that the poison will be applied to their under sides, and will thus be less liable to be washed off by rains or heavy dews.

In using a liquid poison the operator may be protected from it by cloth screens placed upon the opposite sides of the handles B, and attached at their upper and lower edges to two pairs of rearwardly-projecting bars attached to the frame-work of the machine.

If desired, a cross-bar may be rigidly attached to the forward end of the beam A, and may have the rear ends of a pair of shafts hinged to its ends, the forward ends of the said shafts being attached to the lower parts of the horse's hames. Another pair of shafts are hinged to the frame G, and their forward ends are attached to the upper parts of the horse's hames.

The four shafts are further secured in place by being attached to a wide belt, which is buckled around the horse. With this arrangement the machine will be held upright by the four shafts, and the operator can ride upon the horse, and thus be out of the way of the poison.

It operating the machine it will be observed that the cylinder, when filled, having holes on the under side, will retain all the poison without letting any escape until ready to be distributed. The cylinder is then revolved by pulling on one end of the cord, so as to turn the upper or tube side down, and the discharge begins. Only the fluid in the tube is emptied out at once by turning it over; then the air goes up through the tube to the opposite side of the cylinder, and supplies the necessary pressure for the discharge from the small holes. When at the end of the row, in turning the plow around, by pulling on the other end of the cord the discharge can be arrested by turning the tube up.

It will also be observed in filling the cylinder that the same upper holes let the air pass out, so that the cylinder may be filled, thus helping each other in turn in their philosophical arrangement; and when the cylinder is perforated with holes on the lower side, to be worked stationary, these upper holes let the air out of the cylinder as the fluid fills it, and as soon as filled lets the air return in to make the pressure for its instant discharge through the lower holes.

Should the draft prove too much for the horse, one or more small wheels to revolve under the beam may be substituted for the plows, as may be preferred.

Having thus described my invention, I claim as new and desire to secure by Letters Patent—

1. The combination of the two standards D, the frame G, and the pivoted cylinder H, perforated upon its upper side and provided with the tube J, with an ordinary plow-stock, substantially as herein shown and described.

2. The combination of the frame O and the perforated cylinders Q with the frame G, the cylinder H, the two standards D, and an ordinary plow-stock, substantially as herein shown and described.

3. The combination of the loops K, the cords L, and the eyes or pulleys M with the cylinder H and the frame G, substantially as herein shown and described.

THOMAS BURGE TAYLOR.

Witnesses:
SAML. G. BREWER,
REUBEN H. BREWER.